(12) United States Patent
Yokoyama et al.

(10) Patent No.: US 6,177,214 B1
(45) Date of Patent: Jan. 23, 2001

(54) COLOR FILTER MANUFACTURING METHOD, COLOR FILTER, DISPLAY APPARATUS, AND APPARATUS HAVING THE DISPLAY APPARATUS

(75) Inventors: Ryuichi Yokoyama; Katsuhiko Takano, both of Yokohama; Hideaki Takao, Machida; Masashi Sobue, Yokohama; Shoji Shiba, Sagamihara; Takeshi Okada, Kawasaki, all of (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 09/086,307

(22) Filed: May 27, 1998

(30) Foreign Application Priority Data

May 30, 1997 (JP) .................................................... 9-142695

(51) Int. Cl.7 ............................. G02B 5/20; G02F 1/1335
(52) U.S. Cl. .................................. 430/7; 347/1; 347/106; 349/106
(58) Field of Search ........................... 430/7; 347/1, 106; 349/106

(56) References Cited

U.S. PATENT DOCUMENTS

| | | | |
|---|---|---|---|
| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,723,129 | 2/1988 | Endo et al. | 346/1.1 |
| 4,740,796 | 4/1988 | Endo et al. | 346/1.1 |
| 5,716,740 | * 2/1998 | Shiba et al. | 430/7 |
| 5,847,720 | * 12/1998 | Dunand | 347/1 |

FOREIGN PATENT DOCUMENTS

| | | |
|---|---|---|
| 0 702 251 | * 3/1996 | (EP) . |
| 0 738 905 | * 10/1996 | (EP) . |
| 0 753 766 | 1/1997 | (EP) . |
| 0 761 440 | 3/1997 | (EP) . |
| 0 902 315 | 3/1999 | (EP) . |
| 54-56847 | 5/1979 | (JP) . |
| 59-75205 | 4/1984 | (JP) . |
| 59-123670 | 7/1984 | (JP) . |
| 59-138461 | 8/1984 | (JP) . |
| 60-71260 | 4/1985 | (JP) . |
| 63-235901 | 9/1988 | (JP) . |
| 63-294503 | 12/1988 | (JP) . |
| 1-217320 | 8/1989 | (JP) . |
| 5-224013 | 9/1993 | (JP) . |
| 8-006005 | 1/1996 | (JP) . |
| 8-086913 | * 4/1996 | (JP) . |

* cited by examiner

*Primary Examiner*—John A. McPherson
(74) *Attorney, Agent, or Firm*—Fitzpatrick, Cella, Harper & Scinto

(57) ABSTRACT

In a method of manufacturing a color filter, an ink-jet head discharges ink onto a substrate formed on a surface of an ink receiving layer and colors each pixel of the color filter. The ink-jet head discharges ink onto the position of each pixel by using an alignment mark as a reference which is formed on the ink receiving layer.

14 Claims, 14 Drawing Sheets

FIG. 13

| | | COLOR MIXTURE | WHITE OMISSION | EXCELLENT | YIELD |
|---|---|---|---|---|---|
| FIRST EMBODIMENT | | 1 PANEL(S) | 5 PANEL(S) | 94 PANEL(S) | 94% |
| SECOND EMBODIMENT | | 1 PANEL(S) | 2 PANEL(S) | 97 PANEL(S) | 97% |
| THIRD EMBODIMENT | Au | 0 PANEL(S) | 3 PANEL(S) | 97 PANEL(S) | 97% |
| | Ag | 1 PANEL(S) | 2 PANEL(S) | 97 PANEL(S) | 97% |
| | Cu | 0 PANEL(S) | 2 PANEL(S) | 98 PANEL(S) | 98% |
| | Ni | 1 PANEL(S) | 3 PANEL(S) | 96 PANEL(S) | 96% |
| | Cr | 1 PANEL(S) | 4 PANEL(S) | 95 PANEL(S) | 95% |
| FOURTH EMBODIMENT | | 0 PANEL(S) | 2 PANEL(S) | 98 PANEL(S) | 98% |
| FIFTH EMBODIMENT | | 0 PANEL(S) | 3 PANEL(S) | 97 PANEL(S) | 97% |
| SIXTH EMBODIMENT | | 0 PANEL(S) | 1 PANEL(S) | 99 PANEL(S) | 99% |
| SEVENTH EMBODIMENT | | 0 PANEL(S) | 1 PANEL(S) | 99 PANEL(S) | 99% |
| COMPARATIVE EXAMPLE | | 5 PANEL(S) | 9 PANEL(S) | 86 PANEL(S) | 86% |

CONVENTIONAL METHOD : INK IS DISCHARGED USING Bm PATTERN AS A REFERENCE

PRESENT INVENTION : INK IS DISCHARGED USING EXPOSURE MASK AS A REFERENCE

COLOR FILTER MANUFACTURING METHOD, COLOR FILTER, DISPLAY APPARATUS, AND APPARATUS HAVING THE DISPLAY APPARATUS

BACKGROUND OF THE INVENTION

The present invention relates to a color filter manufacturing method for manufacturing a color filter by using an ink-jet head for discharging ink onto a substrate and coloring each pixel of the color filter, a color filter manufactured by the method, a display apparatus using the color filter and an apparatus including the display apparatus.

With recent advances in personal computers, especially portable personal computers, the demand for liquid crystal displays has risen, especially color liquid crystal displays. However, in order to further popularize the use of liquid crystal displays, a reduction of cost must be achieved. Especially, it is required to reduce the cost of a color filter which constitutes a large proportion of the total cost. Various methods have been tried to satisfy the required characteristics of color filters while meeting the above requirements. However, no method capable of satisfying all the requirements has been established. The respective methods will be described below.

The first method is a pigment dispersion method. In this method, a pigment-dispersed photosensitive resin layer is formed on a substrate and patterned into a single-color pattern. This process is repeated three times to obtain R, G, and B color filter layers.

The second method is a dyeing method. In the dyeing method, a water-soluble polymer material as a dyeable material is applied onto a glass substrate, and the coating is patterned into a desired shape by a photolithographic process. The obtained pattern is dipped in a dye bath to obtain a colored pattern. This process is repeated three times to form R, G, and B color filter layers.

The third method is an electrodeposition method. In this method, a transparent electrode is patterned on a substrate, and the resultant structure is dipped in an electrodeposition coating fluid containing a pigment, a resin, an electrolyte, and the like to be colored in the first color by electrodeposition. This process is repeated three times to form R, G, and B color filter layers. Finally, these layers are calcined.

The fourth method is a print method. In this method, a pigment is dispersed in a thermosetting resin, a print operation is performed three times to form R, G, and B coatings separately, and the resins are thermoset, thereby forming colored layers. In all of the above methods, a protective layer is generally formed on the colored layers.

The point common to these methods is that the same process must be repeated three times to obtain layers colored in three colors, i.e., R, G, and B. This causes an increase in cost. In addition, as the number of processes increases, the yield decreases. In the electrodeposition method, limitations are imposed on pattern shapes which can be formed. For this reason, with the existing techniques, it is difficult to apply this method to TFTs. In the print method, a pattern with a fine pitch is difficult to form because of poor resolution and poor evenness.

In order to eliminate these drawbacks, methods of manufacturing color filters by an ink-jet system are disclosed in Japanese Patent Laid-Open Nos. 59-75205, 63-235901, 63-294503 and 1-217320.

Hereinafter, a method of manufacturing a color filter according to the conventional ink-jet printing method is described.

To manufacture a color filter according to the ink-jet printing method, first, a black matrix (BM) is formed on a color filter substrate made of a glass substrate or the like. The black matrix (BM) is a light-shielding pattern used to clarify partition of each pixel for making a display screen clear. The BM is made by forming a metal thin film such as chromium or the like on a color filter substrate in correspondence with the pixel pattern by sputtering or the like. Next, a predetermined resin composition having an ink absorptive characteristic (water absorptive characteristic) is coated on the color filter substrate on which the BM is formed, whereby forming an ink receiving layer. The ink receiving layer is processed by light irradiation or heat treatment, whereby forming a hydrophilic portion (water absorptive portion where ink is absorbed) corresponding to pixels of a color filter and a water repellent portion (portion where ink is not absorbed) serving as a partition wall between pixels of the color filter. Then, ink is discharged by an ink-jet head onto the hydrophilic portion of the color filter substrate and pixels are colored.

However, according to the above-described method, positioning deviation is sometimes generated between a pattern for the water repellent portion and a pattern for the black matrix (BM). The positional offset is caused by (1) non-precise BM pattern, (2) alignment offset between the color filter substrate and a photo-mask used to form the pattern for water repellent portion. When a color filter is manufactured by the ink-jet printing method, in order to eliminate color mixture between adjacent pixels or white omission, ink must be discharged exactly in the center (portion which becomes a pixel of color filter) of two adjacent water repellent portions. Conventionally, the ink-jet head is positioned with respect to the color filter substrate by using an alignment mark as a reference, which is formed on the color filter substrate at the same time the BM pattern is formed. Therefore, the ink-jet head is precisely positioned with respect to the BM pattern, but if the pattern for the water repellent portion and BM pattern deviate as described above, positioning of the ink-jet head with respect to the pattern for the water repellent portion is offset. If the ink-jet head deviates from the pattern of the water repellent portion, defects e.g. color mixture, white omission and the like, are likely to occur.

SUMMARY OF THE INVENTION

The present invention is made in consideration of the above situation, and has as its object to provide a color filter manufacturing method which can prevent color mixture or white omission in the pixels of a color filter.

Another object of the present invention is to provide a color filter manufactured by the above manufacturing method, a display apparatus using the color filter and an apparatus including the display apparatus.

In order to solve the above-described problems and attain the aforementioned objects, the color filter manufacturing method according to the present invention is characterized by the following configuration.

More specifically, the color filter manufacturing method for manufacturing a color filter by using an ink-jet head for discharging ink onto a substrate formed on a surface of an ink receiving layer and coloring each pixel of the color filter, is characterized in that the ink-jet head discharges ink at a position of the each pixel by using a position of a predetermined pattern as a reference, formed on the ink receiving layer.

Furthermore, a color filter according to the present invention is characterized by the following configuration according to its first aspect.

Namely, the color filter manufactured by using an ink-jet head for discharging ink onto a substrate formed on a surface of an ink receiving layer and coloring each pixel of the color filter, is characterized in that the ink-jet head discharges ink at a position of each pixel by using a position of a predetermined pattern as a reference, formed on the ink receiving layer.

Furthermore, the color filter according to the present invention is characterized by the following configuration according to its second aspect.

Namely, the color filter has an alignment mark on an ink receiving layer formed on a surface of a color filter substrate.

Moreover, a display apparatus according to the present invention is characterized by the following configuration according to its first aspect.

More specifically, the display apparatus including a color filter manufactured by using an ink-jet head for discharging ink onto a substrate formed on a surface of an ink receiving layer and coloring each pixel of the color filter, is characterized in that the display apparatus integratedly comprises: the color filter manufactured by discharging ink at a position of the each pixel by using a position of a predetermined pattern as a reference, formed on the ink receiving layer; and light quantity variable means for varying a quantity of light.

Furthermore, the display apparatus according to the present invention is characterized by the following configuration according to its second aspect.

Namely, the display apparatus integratedly comprises: a color filter having an alignment mark on an ink receiving layer formed on a surface of a color filter substrate; and light quantity variable means for varying a quantity of light.

Still further, an apparatus including the display apparatus according to the present invention is characterized by the following configuration according to its first aspect.

More specifically, the apparatus including a display apparatus having a color filter manufactured by using an ink-jet head for discharging ink onto a substrate formed on a surface of an ink receiving layer and coloring each pixel of the color filter, comprises: image signal supply means for supplying the display apparatus with an image signal, wherein the display apparatus integratedly comprises: a color filter manufactured by discharging ink at a position of each pixel by using a position of a predetermined pattern as a reference, formed on the ink receiving layer; and light quantity variable means for varying a quantity of light.

Furthermore, the apparatus including the display apparatus according to the present invention is characterized by the following configuration according to its second aspect.

Namely, the apparatus comprises: a display apparatus integratedly comprising a color filter having an alignment mark on an ink receiving layer formed on a surface of a color filter substrate, and light quantity variable means for enabling to vary a quantity of light; and image signal supply means for supplying the display apparatus with an image signal.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follows the description for determining the scope of the invention.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 13 is a table showing an evaluation result of comparison between the first to seventh embodiments and a comparative example.

DETAILED DESCRIPTION OF THE PREFERRED EMBODIMENTS

Preferred embodiments of the present invention will be described in detail in accordance with the accompanying drawings.

Figure 1:
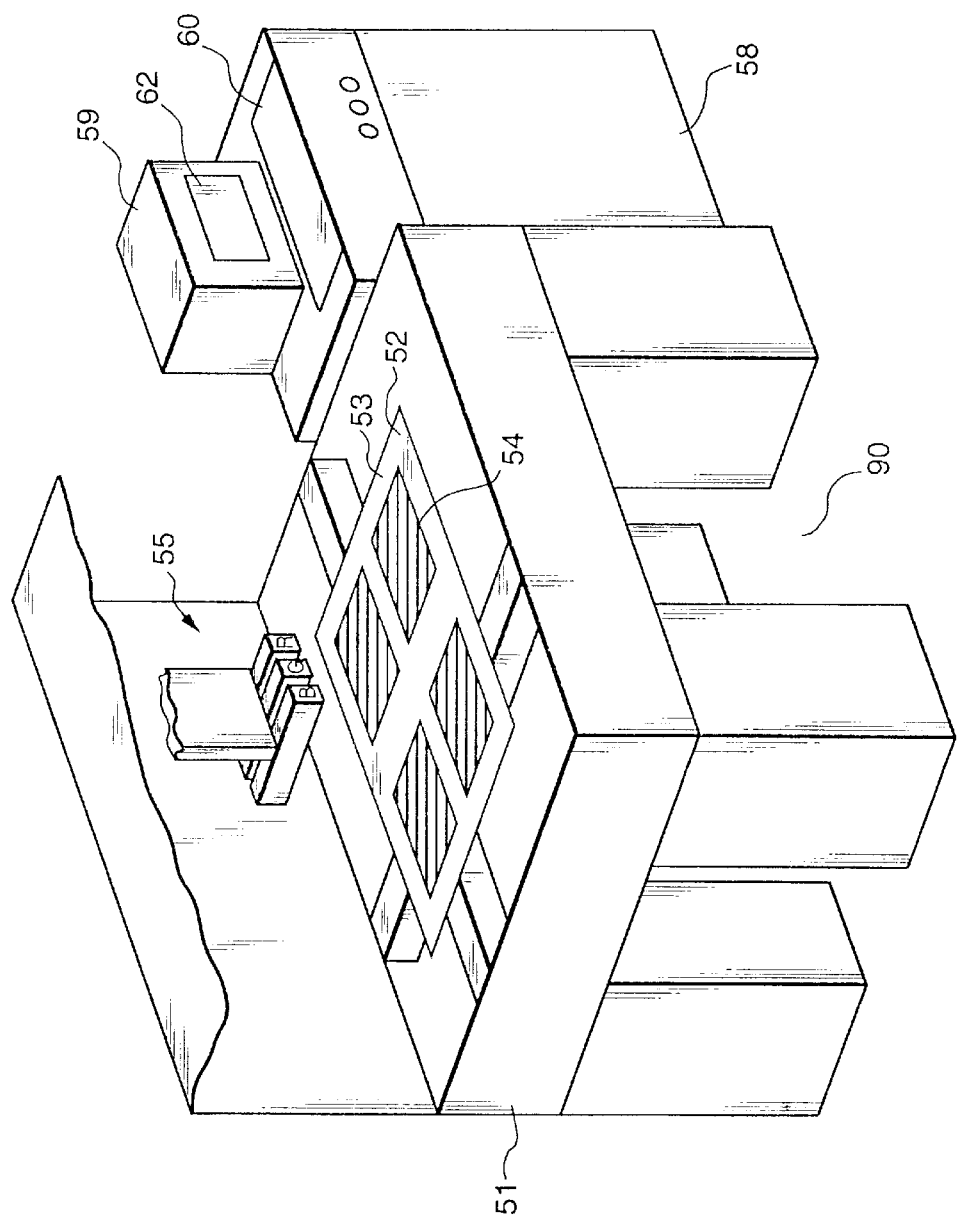
FIG. 1 is a perspective view showing the structure of a color-filter manufacturing apparatus according to an embodiment of the present invention.

FIG. 1 is a perspective view showing the structure of a color-filter manufacturing apparatus according to an embodiment of the present invention.

In FIG. 1, reference numeral 51 denotes a platform of the apparatus; 52, an XY θ stage provided on the platform 51; 53, a color-filter substrate set on the XY θ stage 52; 54, a color filter formed on the color-filter substrate 53; 55, a head unit including R (red), G (green) and B (blue) ink-jet heads for coloring the color filter 54; 58, a controller which controls the overall operation of a color-filter manufacturing apparatus 90; 59, a teaching pendant (personal computer) as a display unit of the controller 58; and 60, a keyboard as an operation unit of the teaching pendant 59. The head unit 55 is detachably mounted to a supporting portion 90a of a color-filter manufacturing apparatus 90, with an adjustable rotation angle with respect to the horizontal surface direction.

Figure 2:
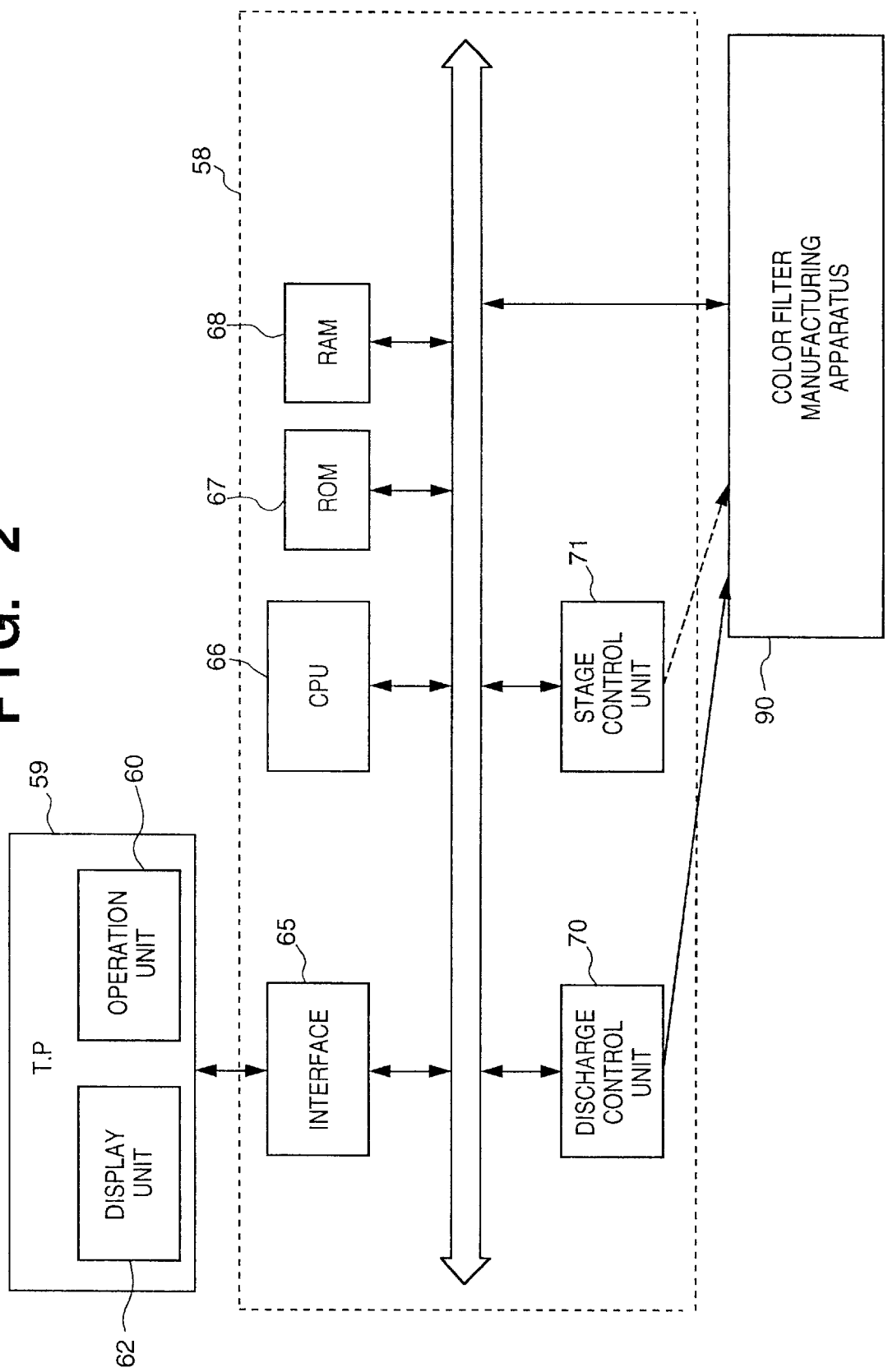
FIG. 2 is a block diagram showing the construction of a controller which controls the operation of the color-filter manufacturing apparatus.

FIG. 2 is a block diagram showing the construction of a controller which controls the operation of the color-filter manufacturing apparatus 90. In FIG. 2, the teaching pendant 59 serves as input/output means of the controller 58. Numeral 62 denotes a display unit which displays information on the progress of manufacturing process, presence/absence of abnormality of the ink-jet head and the like. The keyboard 60 serves as an operation unit for instructing the operation and the like of the color-filter manufacturing apparatus 90.

Reference numeral 58 denotes a controller which controls the overall operation of the color-filter manufacturing apparatus 90; 65, an interface unit for receiving/sending data with respect to the teaching pendant 59; 66, a CPU which controls the color-filter manufacturing apparatus 90; 67, a ROM in which control programs for operating the CPU 66 are stored; 68, a RAM in which production information and the like are stored; 70, a discharge controller which controls ink discharge to respective pixels of a color filter; 71, a stage controller which controls the operation of the XY θ stage 52. The color-filter manufacturing apparatus 90 is connected to the controller 58, and operates in accordance with instructions from the controller 58.

Figure 3:
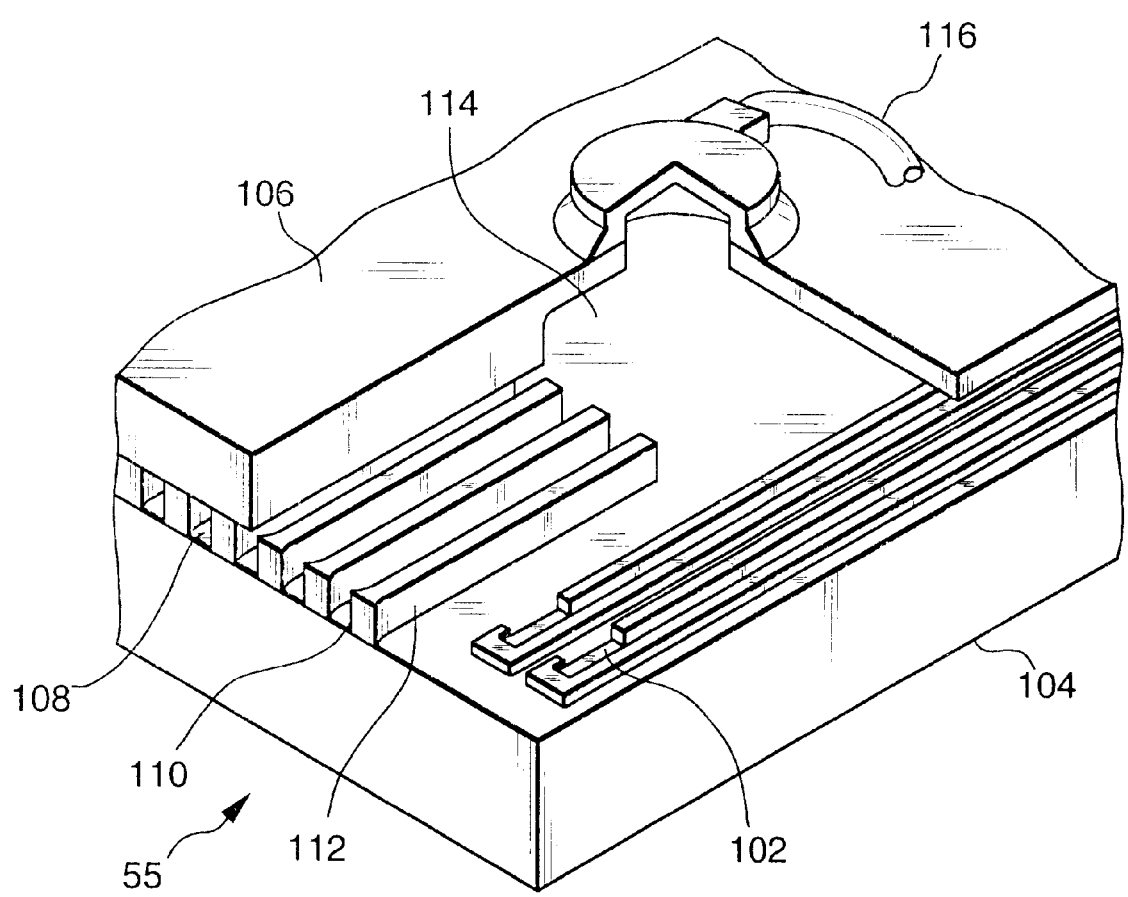
FIG. 3 is a perspective view showing the structure of the ink-jet head used in the color-filter manufacturing apparatus.

FIG. 3 is a perspective view showing the structure of the ink-jet head 55 used in the above color-filter manufacturing apparatus 90. In FIG. 1, the three ink-jet heads IJH are provided in correspondence to the three, R, G and B colors, however, as the three heads have the same structure, FIG. 3 shows the structure of one of these heads.

In FIG. 3, the ink-jet head IJH mainly comprises a heater board 104 as a base plate, a plurality of heaters 102 formed on the heater board 104, and a top plate 106 placed on the heater board 104. A plurality of discharge orifices 108 are formed on the top plate 106, and tunnel-like liquid channels 110 connected to the discharge orifices 108 are formed at the rear of the discharge orifices 108. The respective liquid channels 110 are separated from each other by partition walls 112. The liquid channels 110 are connected to a common ink chamber 114 at the rear of the liquid channels. Ink is supplied to the ink chamber 114 via an ink supply port 116, and the ink is supplied from the ink chamber 114 to the respective liquid channels 110.

The heater board 104 and the top plate 106 are assembled such that the respective heaters 102 are positioned correspondingly to the respective liquid channels 110, as shown in FIG. 3. Although FIG. 3 only shows two heaters 102, the heaters 102 are respectively provided in correspondence to the respective liquid channels 110. In the assembled state as shown in FIG. 3, when a predetermined drive pulse is applied to the heaters 102, the ink on the heaters 102 is boiled to form bubbles, and the ink is pressed due to volume expansion of the bubbles and discharged from the discharge orifices 108. Accordingly, the size of the bubbles can be controlled by controlling the drive pulse, e.g., the level of electric power, applied to the heaters 102. Thus, the volume of the ink discharged from the discharge orifices can be freely controlled.

Figure 4:
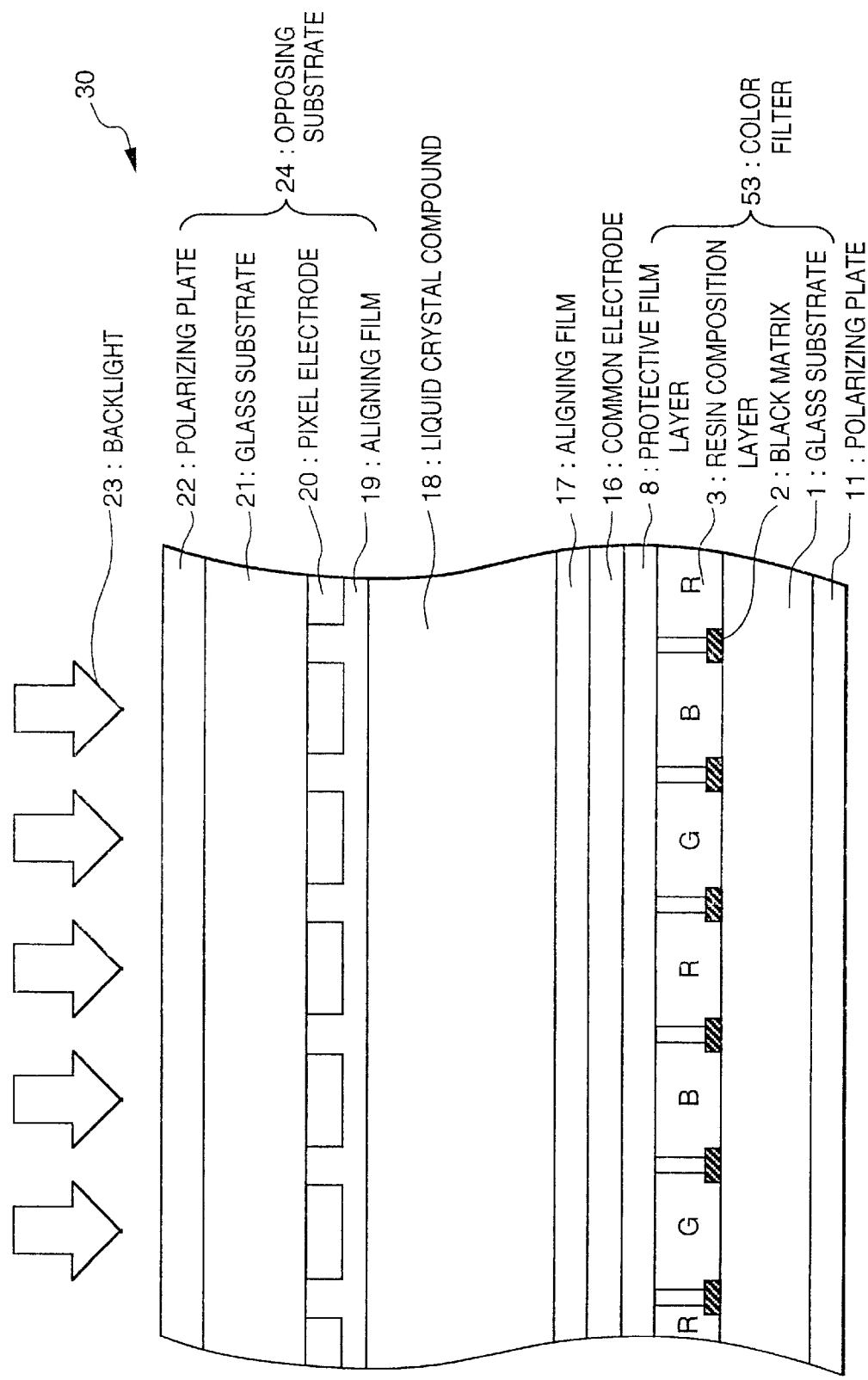
FIG. 4 is a cross-section showing the basic structure of a color liquid crystal display apparatus incorporating the color filter according to an embodiment of the present invention.
Figure 5:
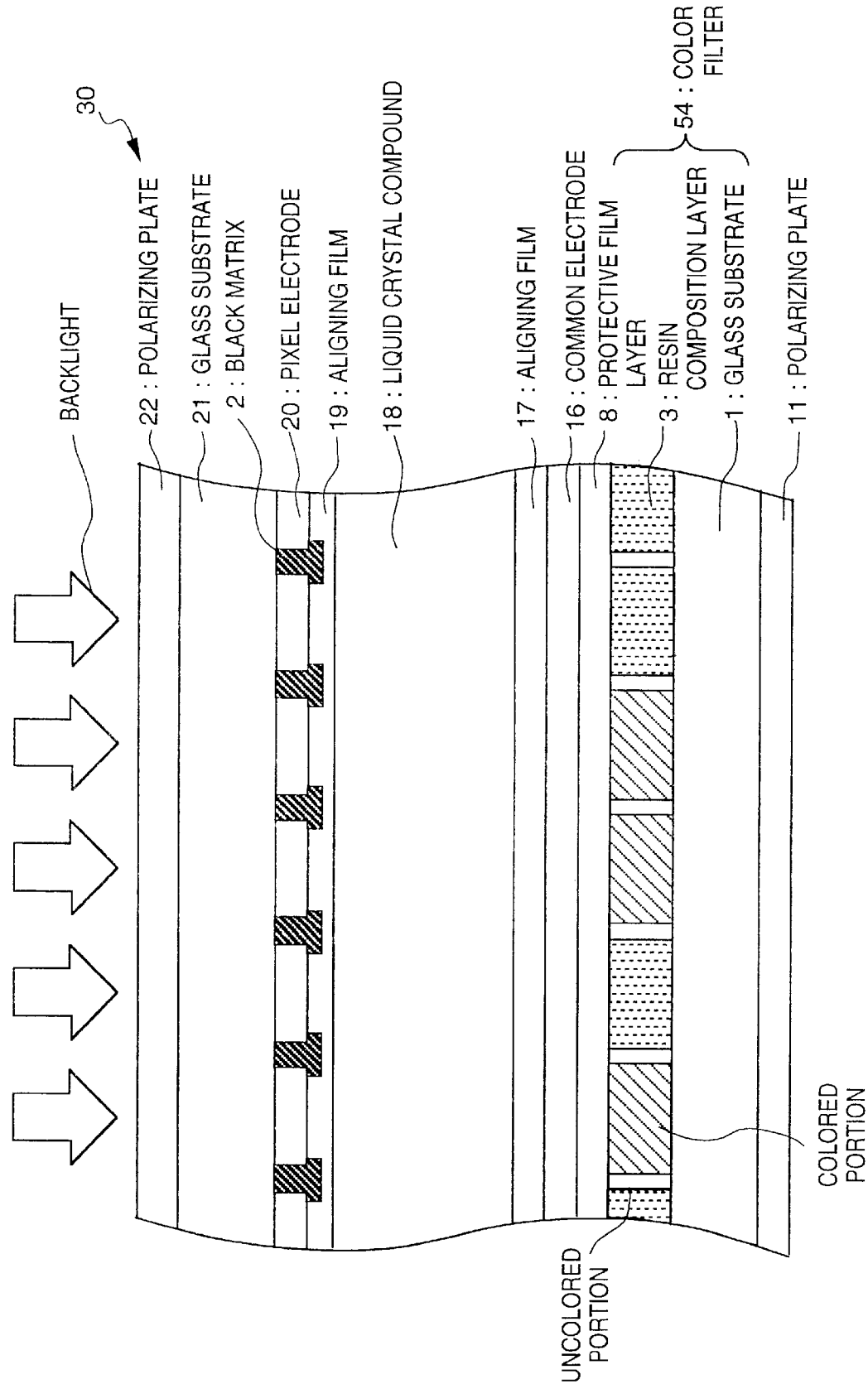
FIG. 5 is a cross-section showing another example of the basic structure of a color liquid crystal display apparatus incorporating the color filter according to an embodiment of the present invention.

FIGS. 4 and 5 are cross sections showing the basic structure of a color liquid crystal display apparatus 30 incorporating the above-described color filter.

Generally, the color liquid-crystal display device is formed by assembling the color filter substrate 1 and an opposing glass substrate 21 and filling liquid crystal compound 18 between them. On the inner surface of the substrate 21, a TFT (not shown) and transparent pixel electrodes are formed in matrix. On the inner surface of the substrate 1, the color filter 54 is provided such that the R, G and B colored portions can be positioned corresponding to each of the pixel electrodes. A transparent counter electrode (common electrode) 16 is formed on the entire surface of the color filter 54. Although the black matrix 2 is generally formed on the side of the color filter substrate 1 (FIG. 4), in a BM (black matrix) on-array type liquid crystal panel, black matrix is formed on the side of the TFT substrate (FIG. 5) opposing the color filter substrate. Further, an orientation film 19 is formed on the surfaces of the both substrates 1 and 21. Liquid-crystal molecules can be oriented in a uniform direction by rubbing processing on the orientation film 19. Further, polarizing plates 11 and 22 are attached to the outer surfaces of the respective glass substrates. The liquid crystal compound 18 is filled in the joint clearance (about 2 to 5 μm) between these glass substrates. As a backlight, the combination of a fluorescent light (not shown) and a light-scattering plate (not shown) is generally used. The liquid-crystal compound functions as an optical shutter to change transmissivity of the backlight, which realizes display.

A case where the above liquid crystal display device is applied to an information processing apparatus will be described below with reference to FIGS. 6 to 8.

Figure 6:
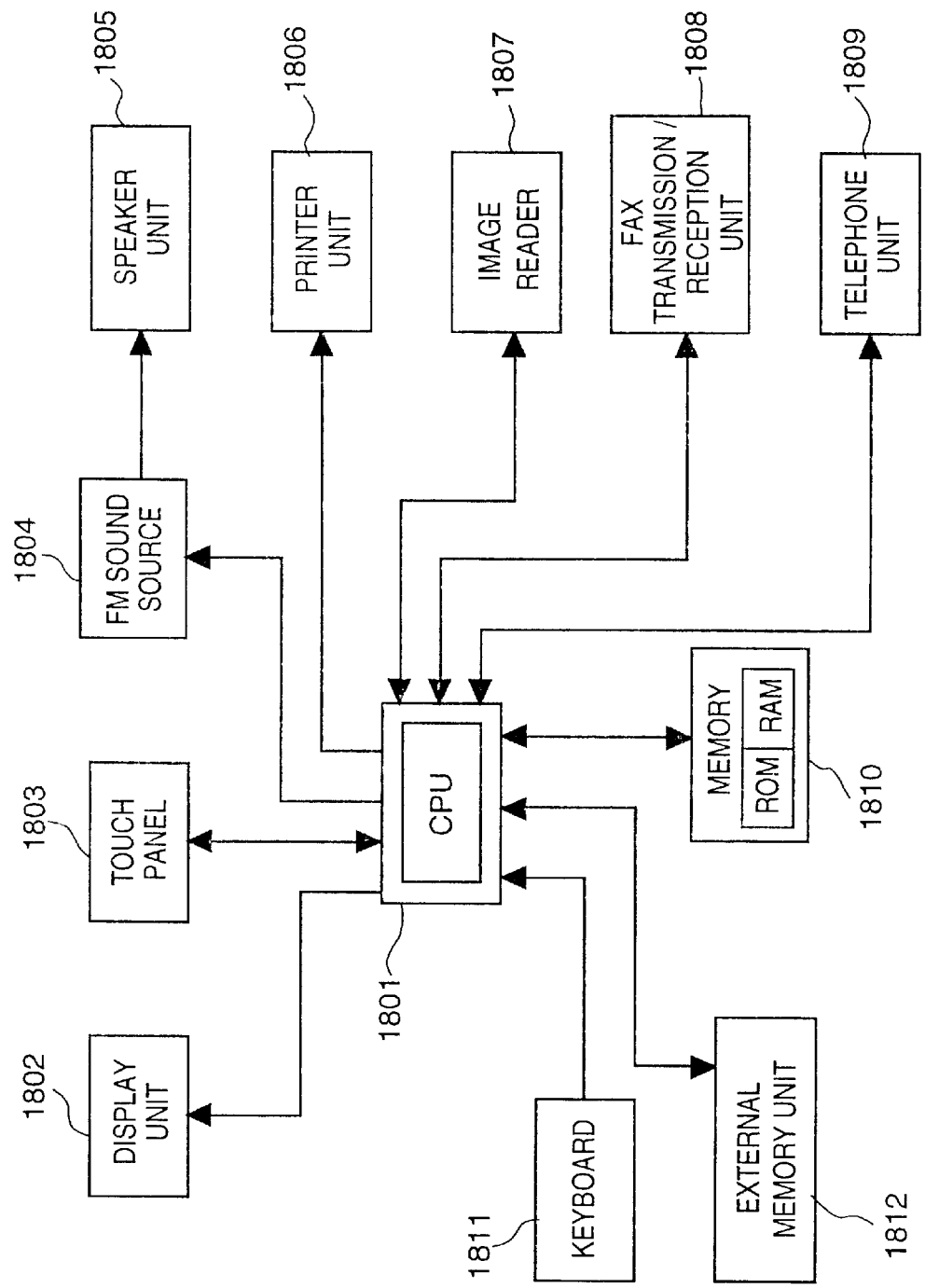
FIG. 6 is a block diagram of an information processing apparatus using the liquid crystal display apparatus.

FIG. 6 is a block diagram showing the schematic arrangement of an information processing apparatus serving as a word processor, a personal computer, a facsimile apparatus, and a copying machine, to which the above liquid crystal display device is applied.

Referring to FIG. 6, reference numeral 1801 denotes a control unit for controlling the overall apparatus. The control unit 1801 includes a CPU such as a microprocessor and various I/O ports, and performs control by outputting/inputting control signals, data signals, and the like to/from the respective units. Reference numeral 1802 denotes a display unit for displaying various menus, document information, and image data read by an image reader unit 1807, and the like on the display screen; 1803, a transparent, pressure-sensitive touch panel mounted on the display unit 1802. By pressing the surface of the touch panel 1803 with a finger or the like, an item input operation, a coordinate position input operation, or the like can be performed on the display unit 1802.

Reference numeral 1804 denotes an FM (Frequency Modulation) sound source unit for storing music information, created by a music editor or the like, in a memory unit 1810 or an external memory unit 1812 as digital data, and reading out the information from such a memory, thereby performing FM modulation of the information. Electrical signals from the FM sound source unit 1804 are converted into audible sound by a speaker unit 1805. A printer unit 1806 is used as an output terminal for a word processor, a personal computer, a facsimile apparatus, and a copying machine.

Reference numeral 1807 denotes an image reader unit for photoelectrically reading original data. The image reader unit 1807 is arranged midway along the original convey passage and designed to read originals for facsimile and copy operations, or other various originals.

Reference numeral 1808 denotes a transmission/reception unit for the facsimile (FAX) apparatus. The transmission/reception unit 1808 transmits original data read by the image reader unit 1807 by facsimile, and receives and decodes facsimile signals. The transmission/reception unit 1808 has an interface function for external units. Reference numeral 1809 denotes a telephone unit having a general telephone function and various telephone functions such as an answering function.

Reference numeral 1810 denotes a memory unit including a ROM for storing system programs, manager programs, application programs, fonts, and dictionaries, a RAM for storing an application program loaded from the external memory unit 1812 and document information, a video RAM, and the like.

Reference numeral 1811 denotes a keyboard unit for inputting document information and various commands.

Reference numeral 1812 denotes an external memory unit using a floppy disk, a hard disk, and the like. The external memory unit 1812 serves to store document information, music and speech information, application programs for the user, and the like.

Figure 7:
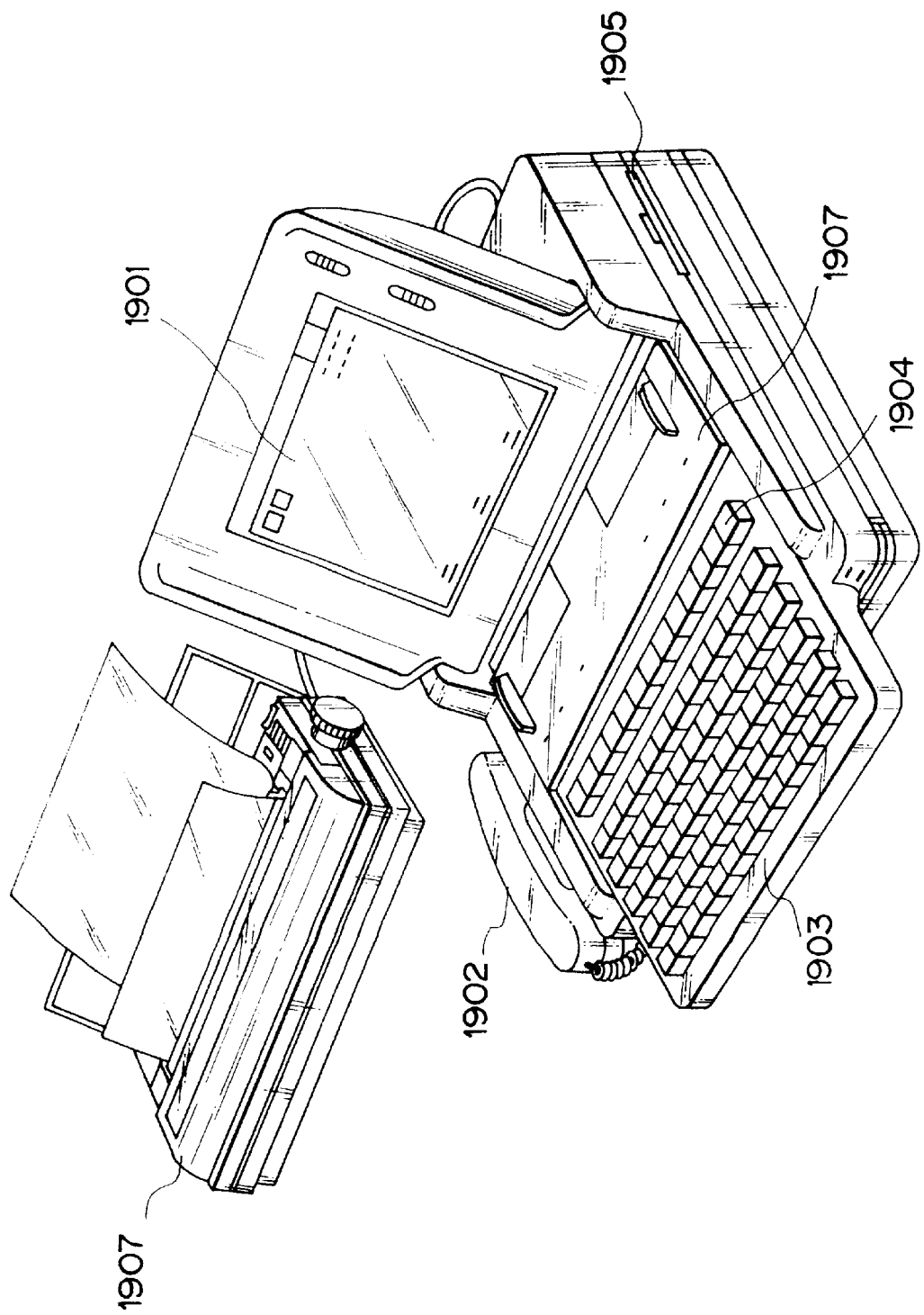
FIG. 7 is an illustration of an information processing apparatus using the liquid crystal display apparatus.

FIG. 7 is a perspective view of the information processing apparatus in FIG. 6.

Referring to FIG. 7, reference numeral 1901 denotes a flat panel display using the above liquid crystal display device, which displays various menus, graphic pattern information, document information, and the like. A coordinate input or item designation input operation can be performed on the flat panel display 1901 by pressing the surface of the touch panel 1803 with a finger of the user or the like. Reference numeral 1902 denotes a handset used when the apparatus is used as a telephone set. A keyboard 1903 is detachably connected to the main body via a cord and is used to perform various document functions and input various data. This keyboard 1903 has various function keys 1904. Reference numeral 1905 denotes an insertion port through which a floppy disk is inserted into the external memory unit 1812.

Reference numeral 1906 denotes an original insertion table on which an original to be read by the image reader unit 1807 is placed. The read original is discharged from the rear portion of the apparatus. In a facsimile receiving operation or the like, received data is printed by an ink-jet printer 1907.

In a case where the above information processing apparatus serves as a personal computer or a word processor, various kinds of information input through the keyboard unit 1811 are processed by the control unit 1801 in accordance with a predetermined program, and the resultant information is output, as an image, to the printer unit 1806.

In a case where the information processing apparatus serves as a receiver of the facsimile apparatus, facsimile information input through the transmission/reception unit 1808 via a communication line is subjected to reception processing in the control unit 1801 in accordance with a predetermined program, and the resultant information is outputted, as a received image, to the printer unit 1806.

In a case where the information processing apparatus serves as a copying machine, an original is read by the image reader unit 1807, and the read original data is output, as an image to be copied, to the printer unit 1806 via the control unit 1801. Note that in a case where the information processing apparatus serves as a transmitter of the facsimile apparatus, original data read by the image reader unit 1807 is subjected to transmission processing in the control unit 1801 in accordance with a predetermined program, and the resultant data is transmitted to a communication line via the transmission/reception unit 1808.

Figure 8:
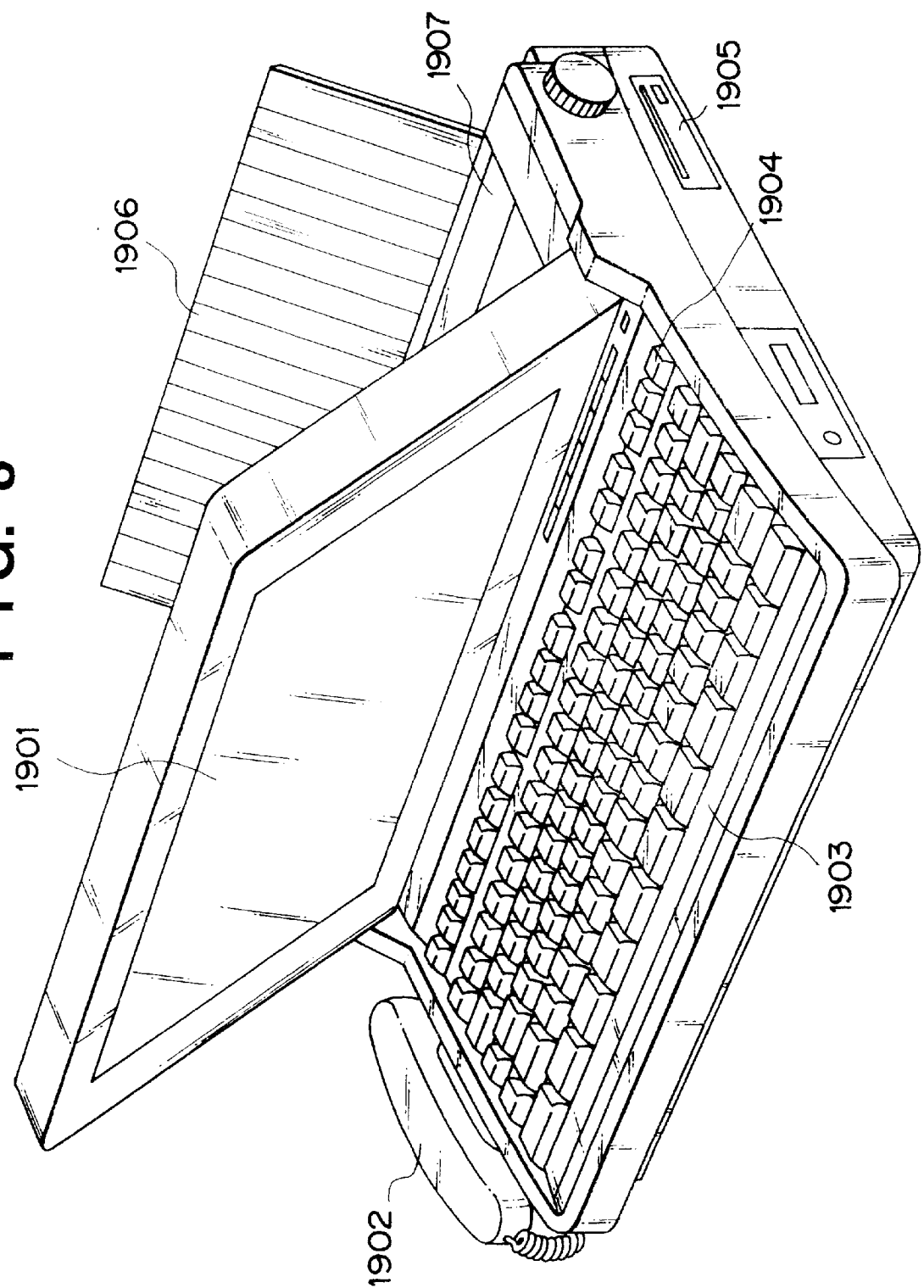
FIG. 8 is an illustration of an information processing apparatus using the liquid crystal display apparatus.

Note that the above information processing apparatus may be designed as an integrated apparatus incorporating an ink-jet printer in the main body, as shown in FIG. 8. In this case, the portability of the apparatus can be improved. The same reference numerals in FIG. 8 denote parts having the same functions as those in FIG. 7.

<EMBODIMENTS>

Next, embodiments of the manufacturing method of the color filter according to the present invention will be described.

FIGS. 9A to 9F are cross-sectional views showing an example of a color-filter manufacturing process.

For a color filter of the present invention, it is preferable that a transparent substrate be used. Although a glass substrate is generally used, it is not limited to a glass substrate as long as the substrate has necessary characteristics to be used as a liquid crystal color filter e.g. transparency, mechanical strength and the like.

First, a black matrix (BM) 203 is generated by forming a chromium thin film on a substrate 201 by sputtering and performing patterning by photolithography process so as to have opening portions (pixel portions). Note that any of metal, resin and the like may be used for the black matrix. The black matrix may be formed on the opposing substrate.

Figure 9A:
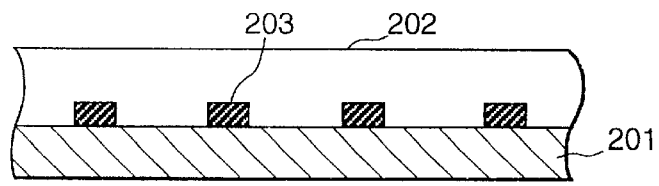
FIGS. 9A to 9F are cross-sectional views showing a first embodiment of a color-filter manufacturing process.

Next, a modifiable resin composition layer (ink receiving layer) 202 is formed on the substrate 201 (FIG. 9A). An example for the resin composition layer used is a material whose ink wettability and/or ink absorptivity on a light-irradiated portion is reduced by light irradiation or a combination of light-irradiation and heat treatment, while the material itself has ink absorptivity. Prebaking may be performed as necessary upon forming the resin composition layer. Note that although description herein is provided on the resin composition layer processed by light irradiation only, a resin composition which reacts to both the light irradiation and heat treatment may be used. The resin composition layer 202 may be formed by various coating methods such as spin coating, roll coating, bar coating, spray coating and dip coating, and formation thereof is not limited to any specific method. Moreover, although the film thickness of the resin composition formed on the substrate can be set arbitrarily, it is preferable to form a thickness of 0.4 $\mu$m to 2 $\mu$m in order to uniformly color the substrate by ink-jet printing method.

Figure 9B:
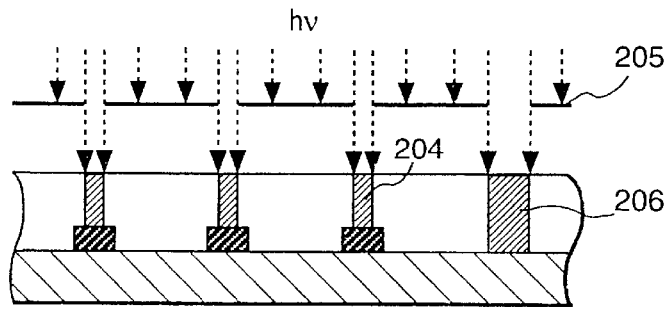
Figure 9C:
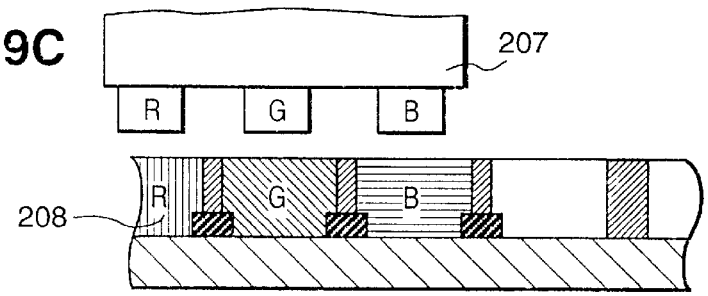

Next, pattern exposure using a photo-mask 205 is performed on the resin composition layer formed on the black matrix 203, so as to form a water repellent portion 204 for repelling color mixture between pixels (FIG. 9B). At this stage, not only the water repellent portion 204 is formed on the black matrix 203, but a predetermined portion besides the effective pixel areas is exposed in the shape of an alignment mark so as to form an alignment mark 206. The alignment mark 206 may be formed within an effective pixel area if that does not cause any inconvenience. Then, using the alignment mark 206 as a reference, an ink-jet head 207 and pixel 208 are positioned, coloring is performed by discharging respective colors of ink e.g., R, G and B, by the ink-jet head 207 (FIG. 9C), and the ink is dried, if necessary. The positioning of the ink-jet head 207 using the alignment mark 206 as a reference is performed by sensing the alignment mark 206 by using a television camera via a microscopic lens and detecting the position of the alignment mark. The photo-mask 205 used at the time of pattern exposure, has opening portions for exposing the resin composition layer on the black matrix 203. Taking into consideration the fact that a relatively large amount of ink needs to be discharged in order to prevent the generating of an uncolored portion at the boundary portion between the black matrix 203 and coloring portions, it is preferable to use a mask having an opening portion smaller than a light-shielding width of the black matrix 203.

Dyes and pigments are both available for the ink used for coloring. For the ink-jet head used in the present invention, a so-called bubble-jet type printhead using an electrothermal transducer as an energy generating element, or a piezo-jet type printhead using a piezoelectric element can be employed. The size of colored area and the coloring pattern can be arbitrarily set.

Figure 9D:
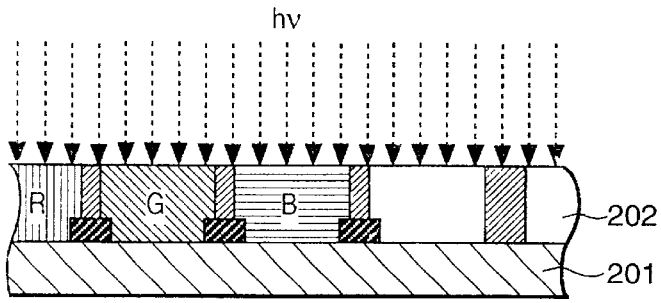

Next, the colored resin composition is cured (FIG. 9D). The method of light irradiation and/or heat treatment are used for curing.

Figure 9E:
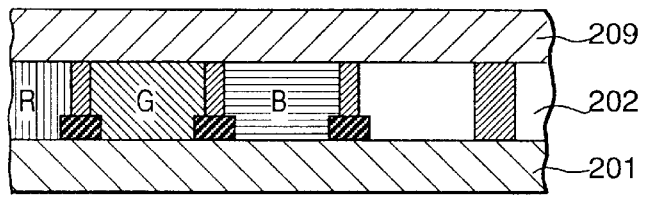

Then, a protective layer 209 is formed on the resin composition layer 202 upon necessary to level the layer (FIG. 9E). Note that although leveling is realized by the protective layer herein, a flat leveling layer may be used, then a protective layer may be formed thereupon. For the protective layer and leveling layer, a photo-setting type, thermo-setting type, or both photo- and thermo-setting type resin material, inorganic film formed by vapor deposition or sputtering and the like are available. As long as the material has transparency for a color filter and has sufficient durability for ITO formation process and the like performed later, the material is usable.

Figure 9F:
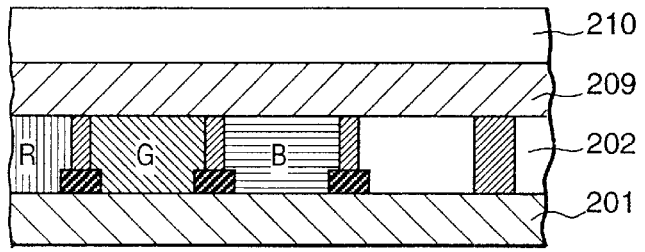
Figure 10A:
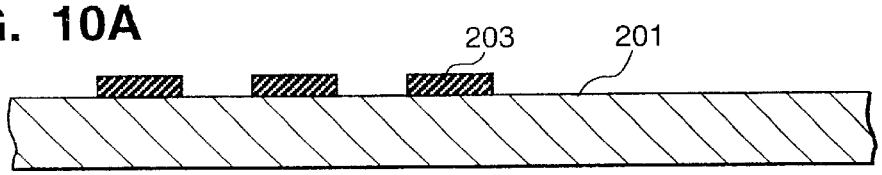
FIGS. 10A to 10F are cross-sectional views showing height differences between an exposed portion and unexposed portion on an ink receiving layer.
Figure 10B:
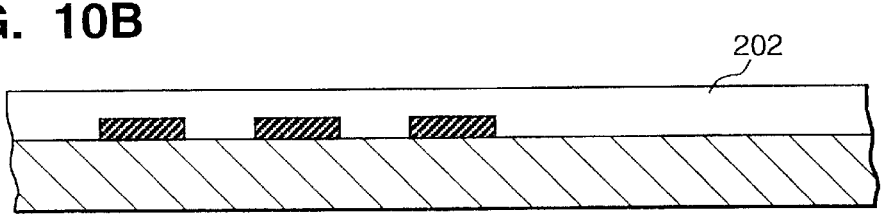
Figure 10C:
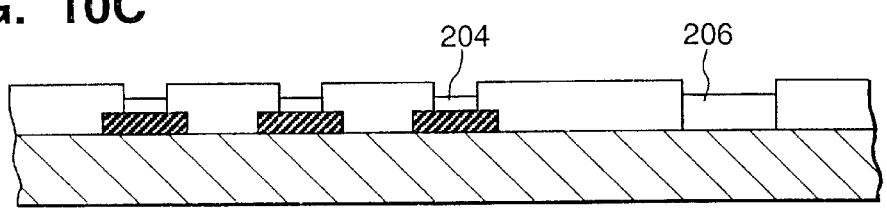
Figure 10D:
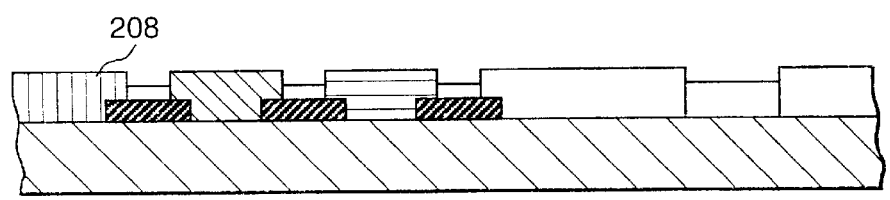
Figure 10E:
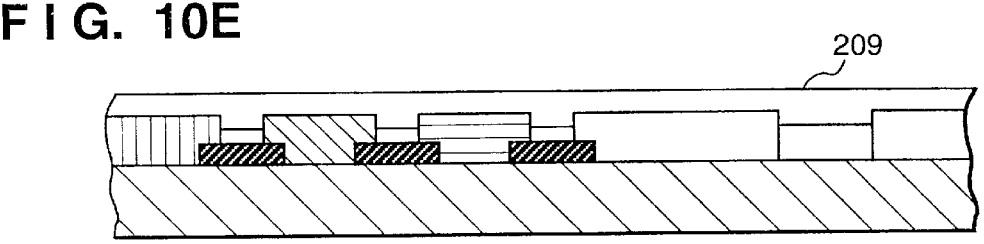
Figure 10F:
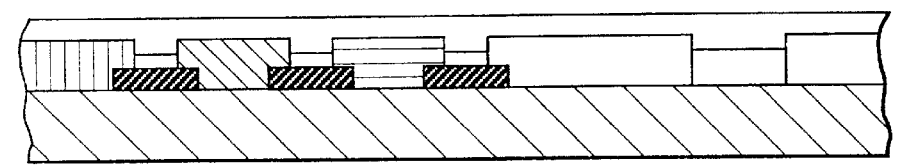
Figure 11A:
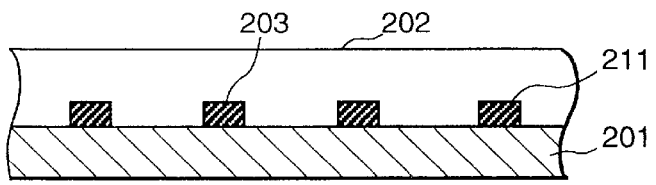
FIGS. 11A to 11F are cross-sectional views showing a second embodiment of a color-filter manufacturing process.
Figure 11B:
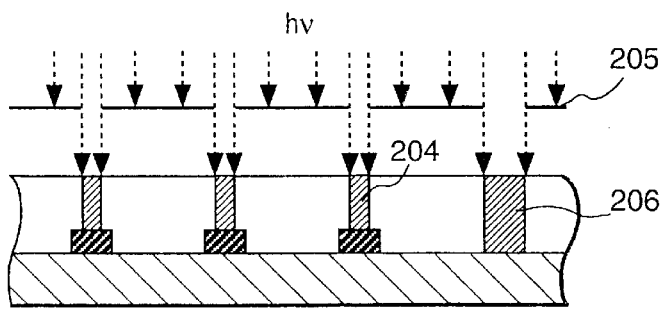
Figure 11C:
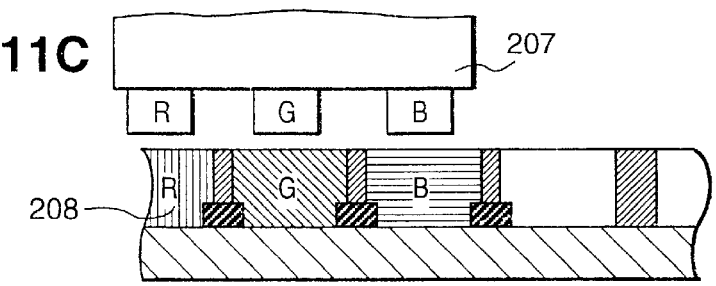
Figure 11D:
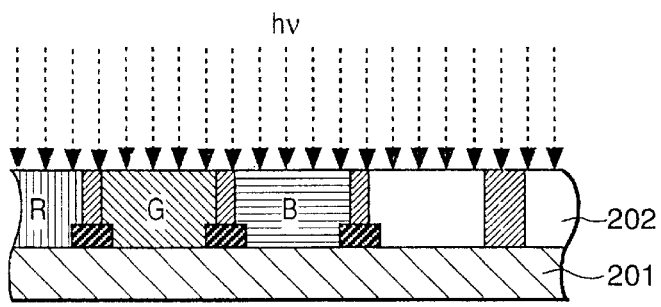
Figure 11E:
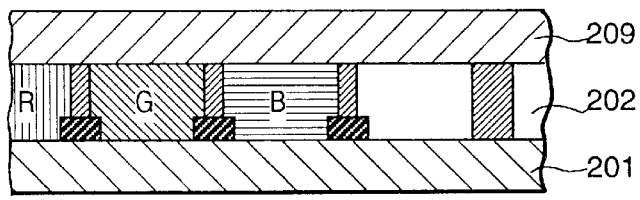
Figure 11F:
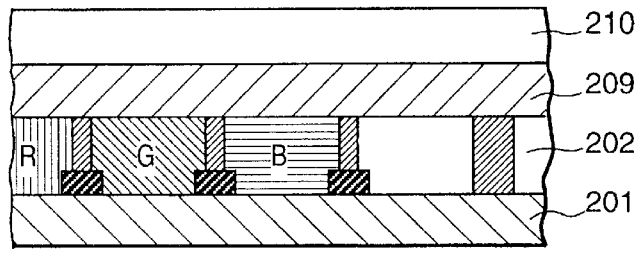
Figure 12A:
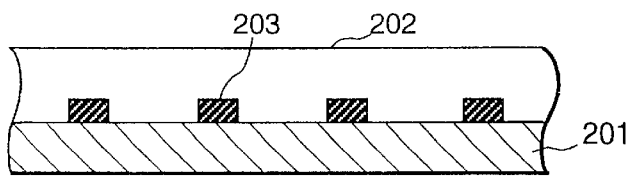
FIGS. 12A to 12G are cross-sectional views showing a fifth embodiment of a color-filter manufacturing process.
Figure 12B:
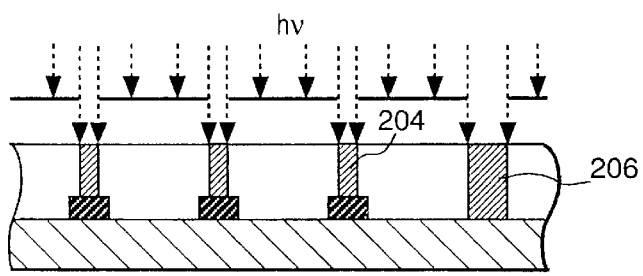
Figure 12C:
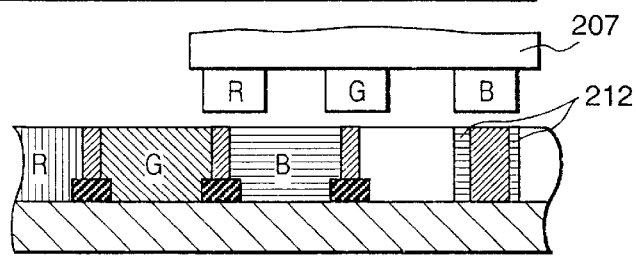
Figure 12D:
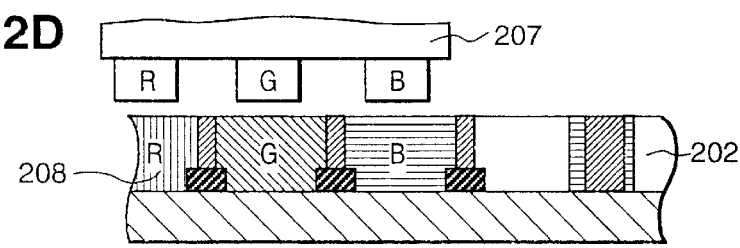
Figure 12E:
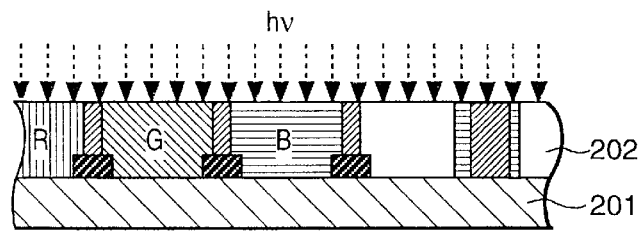
Figure 12F:
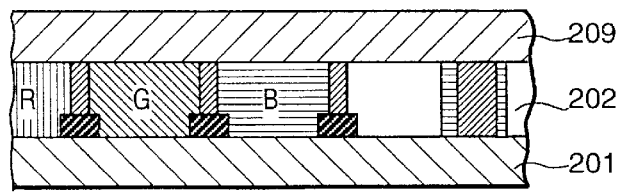
Figure 12G:
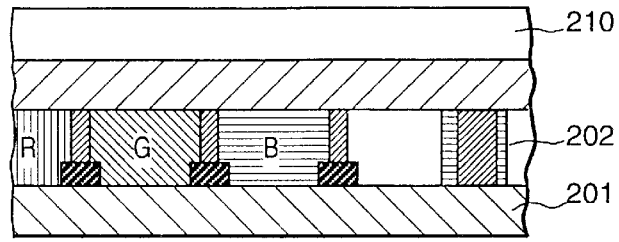

Next, an ITO film 210 is formed by mask sputtering (FIG. 9F). It is preferable to have the film thickness of 1000 Å to 1700 Å where the balance between permeability and sheet resistance is excellent.

Next, the method of detecting the alignment mark 206 and water repellent portion 204 formed on the resin composition layer (ink receiving layer) 202 as described above will be explained with reference to FIGS. 10A to 10F.

The water repellent portion is formed by selectively curing the resin by irradiating energy light beam on the photosensitive ink receiving layer 202, as described above. Thus, the water repellent portion can be formed in an arbitrary position by exposure using mask or exposure method using laser. Then, by performing baking processing, solvent contained in the ink receiving layer is volatilized, and curing in the exposed portion is promoted. By this, a height difference can be generated between the cured portion and non-cured portion. In other words, by preparing an alignment mark on the exposure mask for forming the water repellent portion and exposing the ink receiving layer, an alignment mark can be formed on the ink receiving layer.

The reflected-light-quantity to incident light ratio at the alignment mark portion becomes maximum when the height difference between the height of the marked portion (cured portion) and the height of the periphery portion (non-cured portion) is ¼ of the wavelength of light to be detected. Therefore, the reflected-light-quantity ratio can be arbitrarily set by adjusting the height difference at the alignment mark portion, a light source to be detected and an amount of energy used for curing the ink receiving layer. Alternately, with an arbitrary light source, the reflected-light-quantity ratio can be set by using an optical concave-convex detection method, such as the bright field method, dark field method, differential interference method and so forth. Moreover, the detection precision of an alignment mark, detected at the arbitrary reflected-light-quantity ratio, can be improved by performing image processing.

The water repellent portion 204 on the ink receiving layer is linearly formed. For the method of detecting the line (water repellent line) of the water repellent portion 204 to have the ink-jet head follow the water repellent line, a Push-Pull method and the like which is used for tracking an optical disc can be applied. More specifically, light which is reflected and diffracted by the water repellent line is obtained as an output difference between two photoreceptive portions arranged symmetrically with respect to the center of the coloring portion. By this, a tracking error signal can be detected. Since this method detects the sum of zero-order diffraction light and first-order diffraction light, it is possible to detect an amount and direction of offset based on interference effects of positional offset. Therefore, it is possible to move the ink-jet head to follow the water repellent line at high speed and high precision. In the case of utilizing the Push-Pull method, it is preferable to set the height difference of the water repellent line at ⅛ of the laser beam wavelength to be used. This is because, when the height difference is ¼ of the laser beam wavelength, a phase shift of the light reflected and diffracted respectively at the water repellent portion and coloring portion is π, thus the diffracted light interferes with each other and is canceled; therefore, no signal is obtained. If there is no height difference, the obtained signal will be 0. Accordingly, the intermediate height difference, that is, ⅛ of the wavelength is most preferable.

Hereinafter, more specific embodiments are described.

<First Embodiment>

A black matrix is generated by forming a chromium film, by sputtering, on a surface-polished glass substrate consisting of non-alkali glass to have a thickness of 0.2 μm and patterning the film by photolithography process so as to have opening portions corresponding to pixels. Then, 3 weight % of triphenyl sulfonium hexafluoroantimonate is mixed with 3 weight % of acrylic acid, 97 weight % of acrylic copolymer consisting of 49 weight % of methyl methacrylate, 29 weight % of hydroxy ethyl methacrylate, 19 weight % of N-methylol acrylamide. Then, to 83 weight % of this mixture, 17 weight % of γ-glycidexy propyltrimethoxy silane is mixed. To 15 weight % of this mixture, 85 weight % of ethyl cellosolve is added, and the obtained mixture is coated on the black matrix by spin coating. The coated black matrix is dried for ten minutes at 50° C., and as a result, a photosensitive resin layer (ink receiving layer) having 1 μm thickness is formed.

Next, the ink receiving layer is exposed through the photo-mask having an opening portion smaller than the width of the black matrix as well as an opening portion having the shape of the alignment mark outside the effective pixel areas. Then, heat treatment is performed at 120° C. on a hot plate for 90 seconds. The eight difference at the alignment mark formed on the ink receiving layer is 160 nm.

Furthermore, the alignment mark is sensed by a CCD camera using a laser beam having 633 nm wavelength as a light source, image processing is performed thereupon, a position of the alignment mark is detected, and the ink-jet head is positioned with respect to the glass substrate. Besides a laser beam, a halogen light bulb, tungsten light bulb, mercury light bulb, xenon light bulb and the like may be used as a light source. Further, in order to easily detect a concave or convex portion by optical means, it is possible to combine optical detection methods such as dark field method, differential interference method, phase difference method and the like besides the bright field method.

Then, respective colors of ink: R (red), G (green) and B (blue), each having the following composition, are discharged by the ink-jet head onto a unexposed portion (pixel portion) of the ink receiving layer, whereby coloring the ink receiving layer.

| R ink | |
|---|---|
| C. I. Acid Red 118: | 5 weight % |
| ethylene glycol: | 20 weight % |
| isopropyl alcohol: | 5 weight % |
| water: | 70 weight % |
| G ink | |
| C. I. Acid Green 25: | 5 weight % |
| ethylene glycol: | 20 weight % |
| isopropyl alcohol: | 5 weight % |
| water: | 70 weight % |
| B ink | |
| C. I. Acid Blue 113: | 5 weight % |
| ethylene glycol: | 20 weight % |
| isopropyl alcohol: | 5 weight % |
| water: | 70 weight % |

The ink receiving layer is dried at 90° C. for 10 minutes, then heat-treated at 230° C. for 30 minutes to cure the ink receiving layer. Subsequently, a two-pack thermosetting resin material (composition consisting of Optomer SS6500 and Optomer SS0500 both manufactured by Japan Synthetic Rubber Co. Ltd. mixed at the ratio of 79:21), containing 85% of carbitol acetate, is spin-coated thereon to have a film thickness of 1 $\mu$m. The resultant structure is dried at 90° C. for 10 minutes, then heat-treated at 230° C. for 30 minutes to cure the coated material. As a result, a protective layer is formed. According to the above-described method, the ink discharge position of the ink-jet head can be set exactly in the middle of two water repellent portions; therefore, it is possible to prevent defects caused by deviation of ink discharge position.

The liquid crystal color filter manufactured according to the above-described method is inspected with an optical microscope. As a result, defects such as color mixture or white omission on the filter have greatly decreased.

Furthermore, an ITO film is mask-sputtered by using an in-line sputtering apparatus, and a color filter is generated. By using the color filter, a TFT liquid crystal panel is generated.

<Second Embodiment>

As shown in FIGS. 11A to 11F, an Al film 211 relatively larger than the alignment mark is sputtered to have a thickness of 500 angstrom on the portion of the glass substrate where the alignment mark is formed in the first embodiment. By this, the alignment mark can be easily seen on the resin composition layer. Besides this point, a color filter is manufactured similarly to that in the first embodiment.

<Third Embodiment>

In place of Al film used in the second embodiment, Au, Ag, Cu, Ni and Cr film are respectively sputtered so that the alignment mark can be easily seen. Besides this point, a color filter is manufactured similarly to that in the second embodiment.

<Fourth Embodiment>

In place of Al film used in the second embodiment, a Cr film, the same material as the black matrix, is used. The Cr film is formed at the same time as the formation of the black matrix. Besides the Cr film, a color filter is manufactured similarly to that in the second embodiment.

<Fifth Embodiment>

As shown in FIGS. 12A to 12G, ink is discharged in the periphery of the alignment mark formed on the resin composition layer by exposure, so that a coloring portion 212 where the alignment mark can be easily seen is formed. Besides this point, a color filter is manufactured similarly to that in the first embodiment.

<Sixth Embodiment>

A glass substrate, on which a metal film is formed in the manner similar to that of the third embodiment, is used in the sixth embodiment. Besides this point, a color filter is manufactured similarly to that in the fourth embodiment.

<Seventh Embodiment>

The water repellent line is formed on the ink receiving layer so as to have a height difference of 80 nm. As to optical control, while performing focus control by utilizing an optical unit adopting a method of astigmatism, comprising an object lens, a detection lens, a cylindrical lens and a four-partitioned photoreceptive portion, tracking control is performed according to the Push-Pull method using laser having 633 nm as a light source. At this stage, an ink-jet head, integrating a focus and tracking unit, is mechanically moved to the neighborhood of the coloring-start position. The water repellent line at the end of the coloring-start position is detected by the focus and tracking unit and the ink-jet head is moved to follow the water repellent line. While the ink-jet head follows the water repellent line, respective colors of ink R, G, B are discharged by the ink-jet head to the unexposed portion (pixel portion), coloring the ink receiving layer. Besides the above-described point, a color filter is manufactured in the manner similar to that of the first embodiment.

According to the above method, aligning the ink-jet head with the substrate is unnecessary at the time of coloring operation. In addition, since the position of the ink-jet head can be corrected by optical position detection, the size of the apparatus can be reduced. As a result, productivity can be greatly improved.

Furthermore, since the coloring position is specified by following the water repellent line, even a very little positional offset due to a difference in exposure mask can be corrected.

The liquid crystal color filter manufactured according to the above-described method is inspected by an optical microscope. As a result, defects such as color mixture or white omission on the filter have greatly decreased. Accordingly, yield in color filter manufacturing is greatly increased.

<Comparative Example>

Instead of the alignment mark formed on the resin composition layer by exposure processing, an alignment mark directly formed on the glass substrate is used to position the ink-jet head. Besides this point, a color filter is manufactured similarly to that in the first embodiment.

FIG. 13 shows the results of inspecting color filters by an optical microscope, respectively manufactured according to the aforementioned first to seventh embodiments and the comparative example.

As can be seen from FIG. 13, the color filter manufactured according to the first to seventh embodiments, where the ink-jet head is positioned with the use of the alignment mark and water repellent line formed on the resin composition layer as a reference, is less likely to have color mixture or white omission, and has higher yield in the color filter manufacturing, as compared to the color filter manufactured according to the comparative example where the alignment mark directly formed on the glass substrate is used as a reference for positioning. Moreover, the manufacturing methods according to the second to sixth embodiments, where the alignment mark is made easy to see, have higher yield in color filter manufacturing as compared to the method according to the first embodiment where the alignment mark is simply formed on the resin composition layer.

Furthermore, a TFT liquid crystal panel is manufactured by using the color filter which has been considered "excellent" as a result of the aforementioned inspection using a microscope. As a result, a panel capable of highly precise color displaying is realized.

Figure 14A:
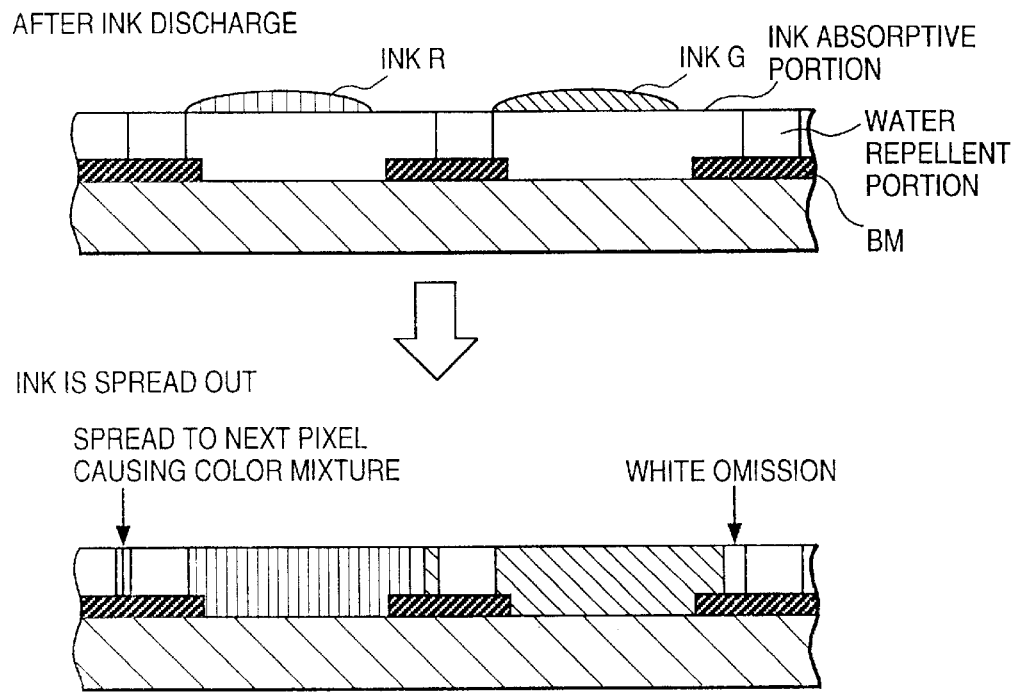
FIGS. 14A and 14B are cross-sectional views for comparing the conventional method with the method according to the present invention.
Figure 14B:
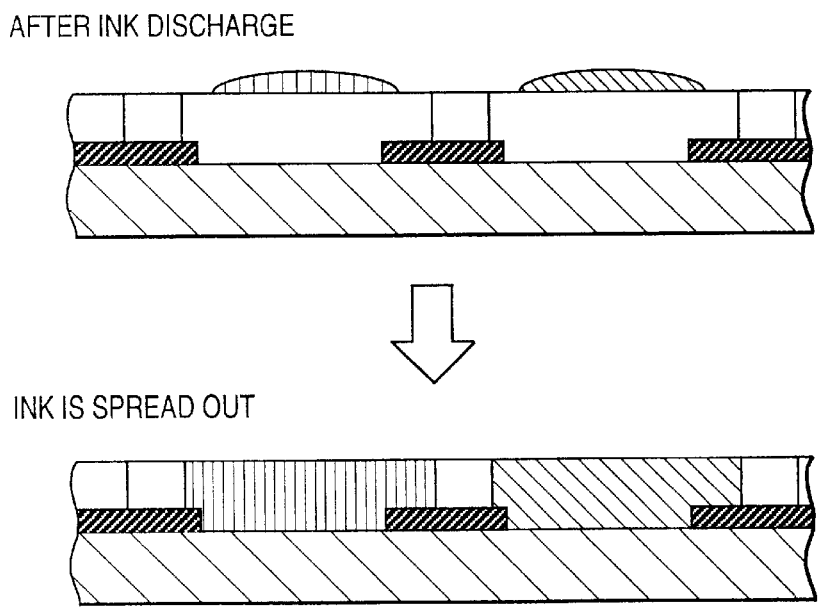

FIGS. 14A and 14B show the mechanism that, in a case where the pattern for the black matrix and pattern for the water repellent portion are deviated, color mixture or white omission is less likely to occur when the alignment mark formed on the resin composition layer is used for positioning an ink-jet head as described in the present invention than to use an alignment mark formed on the glass substrate as conventionally suggested.

More specifically, as shown in the conventional example in FIG. 14A, in a case where an alignment mark is formed on the glass substrate and an ink-jet head is positioned using the black matrix (BM) as a reference, if the pattern of the water repellent portion is deviated from the pattern of the black matrix, ink discharged by the ink-jet head is deviated from the ink absorptive portion.

On the contrary, according to the present invention, a light-transmitting portion for forming an alignment mark is formed on the photo-mask serving as a pattern for forming the water repellent portion. Therefore, there is almost no positional deviation between the alignment mark and the pattern of the water repellent portion on the resin composition layer. Accordingly, by making use of the alignment mark to position the ink-jet head, the ink-jet head can discharge ink precisely at the water absorptive portion between the water repellent portions.

Each of the embodiments described above has exemplified a printer, which comprises means (e.g., an electrothermal transducer, laser beam generator, and the like) for generating heat energy as energy utilized upon execution of ink discharge, and causes a change in state of ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of a so-called on-demand type and a continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse-form driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printhead having a length corresponding to the width of a maximum printing medium which can be printed by the printer, either the arrangement which satisfies the full-line length by combining a plurality of printheads as disclosed in the above specification or the arrangement as a single printhead obtained by forming printheads integrally can be used.

In addition, not only an exchangeable chip type printhead, as described in the above embodiment, which can be electrically connected to the apparatus main unit and can receive ink from the apparatus main unit upon being mounted on the apparatus main unit but also a cartridge type printhead in which an ink tank is integrally arranged on the printhead itself can be applicable to the present invention.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Moreover, in each of the above-mentioned embodiments of the present invention, it is assumed that the ink is liquid. Alternatively, the present invention may employ ink which is solid at room temperature or less, or ink which softens or liquefies at room temperature, or ink which liquefies upon application of a printing signal.

In addition, in order to prevent a temperature rise caused by heat energy by positively utilizing it as energy for causing a change in state of the ink from a solid state to a liquid state, or to prevent evaporation of the ink, ink which is solid in a non-use state and liquefies upon heating may be used. In any case, ink which liquefies upon application of heat energy according to a printing signal and is discharged in a liquid state, ink which begins to solidify when it reaches a printing medium, or the like, is applicable to the present invention. In this case, ink may be situated opposite to electrothermal transducers while being held in a liquid or solid state in recess portions of a porous sheet or through holes, as described in Japanese Patent Laid-Open No. 54-56847 or 60-71260. In the present invention, the above-mentioned film boiling system is most effective for the above-mentioned inks.

As has been described above, the present invention enables to prevent color mixture or white omission on a color filter and greatly improve yield in color filter manufacturing.

The present invention is not limited to the above embodiments and various changes and modifications can be made within the spirit and scope of the present invention. Therefore, to appraise the public of the scope of the present invention, the following claims are made.

What is claimed is:

1. The color filter manufacturing method for manufacturing a color filter by using an ink-let head, comprising the steps of:

discharging ink onto a substrate formed on a surface of an ink receiving layer and coloring each pixel of the color filter; and discharging ink at a position of each pixel by using, as a reference, an alignment mark formed on the ink receiving layer, wherein the ink receiving layer is made of a resin composition layer which is modified by light irradiation and/or heat treatment, and the resin composition layer has a water absorptive characteristic and is modified by the light irradiation and/or heat treatment so as to have a water repellant characteristic, and wherein the light irradiation and/or heat treatment is performed on the ink receiving layer in the shape of the alignment mark so that a portion having the shape of the alignment mark has a water repellent characteristic, forming the alignment mark.

2. The color filter manufacturing method according to claim 1, wherein a thin film is formed at a position on the surface of the substrate, which corresponds to the position of the alignment mark.

3. The color filter manufacturing method according to claim 2; wherein the thin film is made of metal selected from Al, Au, Ag, Cu, Ni or Cr.

4. The color filter manufacturing method according to claim 2, wherein the thin film is made of a same material as that of a light shielding film which serves to clarify a partition of each pixel formed on the substrate.

5. The color filter manufacturing method according to claim 1, wherein a periphery of the alignment mark is colored.

6. The color filter manufacturing method according to claim 1, wherein the ink-jet head is a printhead for discharging ink by utilizing heat energy, and includes heat energy transducers for generating heat energy to be applied to the ink.

7. A color filter manufacturing method for manufacturing a color filter by using an ink-jet head, comprising the steps of:

discharging ink onto a substrate formed on a surface of an ink receiving layer and coloring each pixel of the color filter; and discharging ink at a position of each pixel by using a predetermined pattern, as a reference, formed on the ink receiving layer, wherein the predetermined pattern is a water repellant wall for preventing color mixture of ink between pixels, and the wall is used as an alignment mark.

8. The color filter manufacturing method according to claim 7, wherein coloring each pixel is performed while scanning the ink-jet head and the substrate relatively to each other such that the ink-jet head follows the water repellent wall.

9. A color filter manufactured by using an ink-jet head for discharging ink onto a substrate formed on a surface of an ink receiving layer and coloring each pixel of the color filter, wherein the ink-jet head discharges ink at a position of each pixel by using, as a reference, an alignment mark having a water repellent characteristic formed on the ink receiving layer.

10. A color filter according to claim 9, wherein the water repellent alignment mark is formed by a light irradiation and/or heat treatment performed on the ink receiving layer in the shape of the alignment mark.

11. A color filter having an alignment mark with a water repellent characteristic on an ink receiving layer formed on a surface of a color filter substrate.

12. A color filter according to claim 11, wherein the water repellent alignment mark is formed by a light irradiation and/or heat treatment performed on the ink receiving layer in the shape of the alignment mark.

13. A display apparatus comprising:

a color filter formed by discharging ink onto a substrate formed on a surface of an ink receiving layer and coloring each pixel of the color filter, and discharging ink at a position of each pixel by using, as a reference, an alignment mark formed on the ink receiving layer, wherein the ink receiving layer is made of a resin composition layer which is modified by light irradiation and/or heat treatment, and the resin composition layer has a water absorptive characteristic and is modified by the light irradiation and/or heat treatment so as to have a water repellant characteristic, wherein the light irradiation and/or heat treatment is performed on the ink receiving layer in the shape of the alignment mark so that a portion having the shape of the alignment mark has a water repellent characteristic, forming the alignment mark; and light quantity variable means for varying a quantity of light.

14. An apparatus, comprising:

a display apparatus having a color filter formed by discharging ink onto a substrate formed on a surface of an ink receiving layer and coloring each pixel of the color filter, and discharging ink at a position of each pixel by using, as a reference, an alignment mark formed on the ink receiving layer, wherein the ink receiving layer is made of a resin composition layer which is modified by a light irradiation and/or heat treatment, and wherein the resin composition layer has a water absorptive characteristic and is modified by the light irradiation and/or heat treatment so as to have a water repellant characteristic, wherein the light irradiation and/or heat treatment is performed on the ink receiving layer in the shape of the alignment mark so that a portion having the shape of the alignment mark has a water repellent characteristic, forming the alignment mark;

light quantity variable means for varying a quantity of light; and image signal supply means for supplying said display apparatus with an image signal.

* * * * *

UNITED STATES PATENT AND TRADEMARK OFFICE
CERTIFICATE OF CORRECTION

PATENT NO.    : 6,177,214 B1                                     Page 1 of 1
DATED         : January 23, 2001
INVENTOR(S)   : Ryuichi Yokoyama et al.

It is certified that error appears in the above-identified patent and that said Letters Patent is hereby corrected as shown below:

<u>Title page,</u>
After [73] Assignee, please insert the following:

-- [*] Notice: This patent issued on a continued prosecution application filed under 37 CFR 1.53(d), and is subject to the twenty year patent term provisions of 35 U.S.C. 154 (a)(2). --

<u>Column 10,</u>
Line 50, "eight" should read -- height --.

Signed and Sealed this

Fifth Day of March, 2002

Attest:

Attesting Officer

JAMES E. ROGAN
*Director of the United States Patent and Trademark Office*